: 3,247,244
METHOD FOR PRODUCING ORGANIC
PEROXYACIDS
John H. Blumbergs, Highland Park, Harold K. Latourette, Pennington, and Sidney Berkowitz, Highland Park, N.J., assignors to FMC Corporation, New York, N.Y., a corporation of Delaware
No Drawing. Filed May 24, 1962, Ser. No. 197,282
9 Claims. (Cl. 260—502)

This invention relates to the preparation of organic peroxyacids by reaction of their precursor organic acid halides or organic acid anhydrides with aqueous alkaline hydrogen peroxide solutions.

Organic peroxyacids such as peracetic acid and performic acid are well known as oxidizing agents in the preparation of oxirane compounds. However, some oxirane compounds cannot be produced by oxidation with the lower peroxycarboxylic acids and require a more powerful oxidizing agent, such as certain higher molecular weight peroxycarboxylic acids, e.g., aromatic peroxycarboxylic acids. While the lower acids are available commercially, higher molecular weight aliphatic and aromatic peroxyacids are not generally available because of the relatively high cost of producing them. This high cost is due to the relatively long reaction times required for producing them and to the moderate yields obtained by known processes.

One method for producing peroxyacids is by reacting an organic acyl halide with an alkali metal peroxide solution in the presence of a solvent. This reaction is illustrated by the following equation:

Equation 1

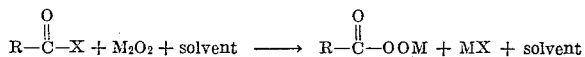

where R is an organic radical,
where X is a halogen atom,
where M is an alkali metal.

While many solvents have been used, e.g., ethyl alcohol, methyl alcohol, tetrahydrofuran, dioxane, diethyl ether, monochlorobenzene and benzene, the reaction invariably is a long one and yields leave much to be desired.

It is an object of the present invention to prepare higher molecular weight organic peroxyacids including aromatic, cycloaliphatic and aliphatic peroxyacids from their precursor acyl halides or acyl anhydrides in virtually quantitative yields and with a material reduction in the reaction time.

This and other objects will be apparent from the following disclosure.

It has now been found that high molecular weight organic peroxycarboxylic acids can be produced in virtually quantitative yields by reaction of the precursor acyl halide or acyl anhydride of the peroxycarboxylic acid which is to be produced, with an aqueous solution of an alkali metal peroxide containing above about 1% by weight active oxygen (and preferably between about 1 to 3%), in the presence of an aliphatic tertiary alcohol which is water soluble in amounts of at least about 5%. The aliphatic tertiary alcohol acts as a reaction promoter and is employed preferably in at least about a 2:1 weight ratio with respect to the precursor acyl halide or anhydride.

The reaction mixture can either be homogeneous or heterogeneous, depending upon the solubility of the tertiary alcohol and the alkali metal salt of the peroxyacid in the aqueous reaction mixture. Tertiary alcohols having limited solubility in water, but above 5% by weight, such as tertiary amyl alcohol, always result in heterogeneous reaction systems.

The aliphatic tertiary alcohols which have been found effective as reaction promoters are those having water solubilities above about 5% by weight. Tertiary aliphatic alcohols, such as tert-butyl alcohol and tert-amyl alcohol are preferred. Alcohols having water solubilities below about 5% by weight have not been found effective as reaction promoters. For example, triethylcarbinol when employed in this process has resulted in extremely poor yields; this tertiary alcohol is virtually insoluble in water.

The tertiary alcohol is employed in amounts of at least a 2:1 weight ratio with respect to the precursor acyl halide or anhydride. Larger amounts, e.g., 4 parts by weight of tertiary alcohol to 1 part by weight of acyl halide or anhydride, have been found effective. Larger amounts of tertiary alcohol can be employed but do not offer any advantage. Tertiary alcohols in amounts below the 2:1 weight ratio can be employed but yields become progressively poorer. Accordingly, tertiary alcohols in at least about a 2:1 weight ratio with respect to the precursor acyl halide or anhydride are preferred.

In carrying out the process, the alkali metal peroxide solution is made up by mixing a dilute solution of an alkali metal hydroxide with a solution of hydrogen peroxide. It can also be made up by dissolving an alkali metal peroxide, e.g., $Na_2O_2$, in water. In either case, the resulting solution is the same. This reaction mixture is maintained at temperatures of between $-10°$ C. to $+20°$ C. and preferably at from $0°$ C. to $+10°$ C. Thereafter, the tertiary alcohol is introduced into the prepared alkaline peroxide solution, followed by the addition of an acid chloride or acid anhydride with adequate cooling. The resultant reaction is complete in from 15 to 60 minutes, depending on the reactivity of the acid chloride or acid anhydride employed. The yield of peroxycarboxylic acid recovered from the reaction mixture is virtually quantitative, being above about 95%.

In the above process, the alkali metal peroxide solution should have an active oxygen content of about 1 to 3% by weight. Higher active oxygen contents can be employed if the salt of the peroxycarboxylic acid produced has sufficient solubility in the reaction mixture. Peroxide solutions having excessively high active oxygen contents should be avoided because they prevent the salt of the peroxycarboxylic acid from dissolving in the reaction mixture; the resultant thick slurries prevent effective stirring and make operation difficult. When the active oxygen content of the alkaline peroxide solution is lower than about 1%, the acyl chloride tends to hydrolyze to yield the corresponding carboxylic acid and thus lowers the yield of the peroxycarboxylic acid product. At active oxygen contents above about 1%, the hydrolysis of the precursor acyl halide is virtually eliminated.

The reaction is best carried out at temperatures of $-10°$ C. to $+20°$ C. and preferably about $0°$ C. to $10°$ C. Higher reaction temperatures can also be employed. However, as the temperature increases, the stability of the salt of the organic peroxyacids decreases and they can be converted more readily to the resultant organic carboxylic acids. Accordingly, the use of higher temperatures must be conditioned upon the stability of the particular metal salt of the organic peroxyacid being produced. Temperatures lower than $0°$ C. can be employed without fear of increased decomposition to the product. However, as the temperature decreases, the solubility of the salt of the organic peroxyacid decreases. This results in the formation of thick slurries which are objectionable because they prevent good stirring and are difficult to handle. The thick slurries can be avoided at these low temperatures by reducing the ratio of reactants to tertiary alcohol, but this is undesirable since the producing capacity of any given reactor is thereby decreased.

The organic acyl halides and anhydrides which can be reacted according to this process are those containing aromatic, cycloaliphatic or aliphatic residues. These residues may be unsubstituted or substituted with groups such as halides, $NO_2$, $C \equiv N$, or methoxy groups. The aromatic and cycloaliphatic residues can also be substituted with aliphatic groups. The halides or anhydrides can either be monobasic or dibasic. Monobasic carboxylic acid halides which can be employed include benzoyl chloride, isobutyryl bromide, naphthoyl chloride, octanoyl chloride, lauryl chloride, cyclohexanecarbonyl chloride and benzoyl bromide. Monobasic anhydrides which can be employed include benzoic acid anhydride, butyric anhydride and isobutyric anhydride. Dibasic anhydrides which can be employed include succinic anhydride, maleic anhydride and phthalic anhydride. Dibasic halides which can be employed include succinyl chloride, phthalyl chloride, sebacyl chloride and adipyl chloride. In addition, substituted carboxylic acid halides which can be reacted according to this process include chlorobenzoyl chloride, α-chlorolauryl chloride, nitrobenzoyl chloride, cyanobenzoyl chloride, methoxybenzoyl chloride and methylbenzoyl bromide.

The process can be carried out either in batch or in a continuous process. In a batch process, the tertiary alcohol is separated from the alkali metal salt of the peroxycarboxylic acid by distillation or other suitable means. Distillation under reduced pressure is advantageous since low temperatures can be employed. The alkali metal salt of the peroxycarboxylic acid can be converted to the peroxycarboxylic acid by acidification with an acid such as sulfuric acid or phosphoric acid and by extracting the peroxycarboxylic acid thus produced with an organic solvent. In the case of a continuous process, the feed reactants, i.e., the organic acyl halide or anhydride and the alkaline hydrogen peroxide solution, are continually added to a reactor along with make-up tertiary alcohol. A portion of the reaction mixture is removed continuously from the reactor and treated for recovery of the peroxycarboxylic acid in the same manner as the batch process. The recovered tertiary alcohol is recycled to the reactor for additional use. In this manner, peroxycarboxylic acid is continually produced from the reactor as product.

The following examples are presented by way of illustration only and are not deemed to be limiting of the present invention.

*Example I*

In a one-liter, three-neck flask, equipped with a stirrer, was placed 10.5 g. sodium hydroxide dissolved in 100 ml. of distilled water. The solution was cooled to +2° to +6° C. and 9.0 g. of 50% hydrogen peroxide was slowly added with vigorous agitation. Then 85 g. of tert-butyl alcohol was added. During these additions, the temperature of the reaction mixture was maintained at 2° to 6° C. by cooling the reaction flask in an ice bath. Then 17.5 g. of benzoyl chloride was slowly added in a period of five minutes. The reaction mixture was stirred for an additional 15 minutes at +2° to +6° C. Then it was diluted with water to dissolve all of the sodium peroxybenzoate formed and was analyzed for its composition.

The unreacted hydrogen peroxide present was determined by a ceric sulfate titrate and the peroxyacid—by titration with 0.1 N sodium thiosulfate, as described in detail in Anal. Chem. 20, 1061 (1948). An aliquot of the aqueous mixture was analyzed by this method and showed that 17.1 g. of peroxybenzoic acid was obtained, giving a yield of 99.6%, based on the benzoyl chloride feed. Only 0.15 g. of unreacted hydrogen peroxide was present in the reaction mixture after the run.

The tert-butyl alcohol used as reaction solvent was recovered by distillation under reduced pressure for reuse.

The peroxyacid was isolated by acidifying the aqueous mixture with sulfuric acid and extracting the peroxyacid with an organic solvent. The solid peroxybenzoic acid was obtained from this solution by crystallization.

*Example II*

The same procedure was employed as in Example I, except that 85 g. of tert-amyl alcohol was used instead of tert-butyl alcohol. There was obtained 16.8 g. of peroxybenzoic acid, which corresponds to 97.5% yield, based on the acid chloride feed.

*Example III*

The same procedure was employed as in Example I, except that 14.7 g. of potassium hydroxide was used instead of 10.5 g. sodium hydroxide. The yield of peroxybenzoic acid was 17.0 g., which corresponds to 99.0% yield, based on the benzoyl chloride feed.

*Example IV*

The same procedure was employed as in Example I, except that 21.85 g. of m-chlorobenzoyl chloride was used as feed. There was obtained 21.5 g. of m-chloroperoxybenzoic acid, which corresponds to a yield of 99.5% based on the acid chloride feed.

*Example V*

The same procedure was employed as in Example I, except that 21.85 g. or p-chlorobenzoyl chloride was used as feed. After one hour reaction time, 20.4 g. of p-chloroperoxybenzoic acid was obtained, giving a yield of 95.0%, based on the acid chloride feed. A small amount of p-chlorobenzoyl peroxide was also present in the reaction mixture. It was separated by filtration.

*Example VI*

In a two-liter, three-neck flask, equipped with stirrer, was placed 63.0 g. of distilled water. The reaction flask was cooled in an ice bath. Fifty-four grams of 50% hydrogen peroxide was added, followed by 590 g. of tert-amyl alcohol. Then 131 g. of p-chlorobenzoyl chloride was slowly added while the temperature of the reaction mixture was maintained at 6° to 8° C. The mixture was stirred for an additional one hour at 8° C. and was then diluted with 800 g. of distilled water. The tert-amyl alcohol was separated from the reaction mixture by extraction with three 200 ml. portions of benzene.

The aqueous layer was subject to analysis as described in Example I and contained 120 g. of p-chloroperoxybenzoic acid. The yield of peroxyacid was 94.2%, based on the acid chloride feed.

The tert-amyl alcohol was recovered from the benzene layer by distillation for reuse.

The p-chloroperoxybenzoic acid was isolated from the aqueous layer by acidifying with 200 g. of 20% sulfuric acid and extracting with three portions of 300 ml. of diethyl ether.

*Example VII*

The same procedure was employed as in Example I, except that 21.85 g. of o-chlorobenzoyl chloride was used as feed. Analysis showed that after thirty minutes reaction time, the reaction mixture contained 20.9 g. of o-chloroperoxybenzoic acid which corresponds to 97.0% yield, based on the acid chloride feed.

The reaction mixture was diluted with 200 ml. of distilled water, was acidified with 70 g. of 20% sulfuric acid and extracted twice with 150 ml. of diethyl ether. The ether solution was dried over anhydrous $MgSO_4$ and the solvent was evaporated under reduced pressure. There were obtained 20.0 g. of white, crystalline material with slight phenolic odor, melting point 56°–57° C. These solids had an active oxygen content of 9.21% by weight. A portion of these solids was recrystallized from isooctane and was analyzed:

Found: C, 48.95%; H, 3.41%; Cl, 20.47%; active O–9.27%. Theoretical: C, 48.7%; H, 3.47%; Cl, 20.57%; active O–9.27%.

The product was found to be pure o-chloroperoxybenzoic acid.

Example VIII

To a one-liter, three-neck flask, supplied with a stirrer, was added 18.0 g. of sodium hydroxide dissolved in 140 ml. of distilled water. The solution was cooled to 2° to 6° C. and 15.0 g. of 50% hydrogen peroxide was added, using adequate agitation and cooling. Then 125 g. of tert-butyl alcohol was added. The temperature was maintained at 2° to 6° C. by cooling the reaction flask in an ice bath. Then 43.8 g. of lauroyl chloride was slowly added and the mixture was maintained at 2° to 6° C. for an additional hour with adequate agitation.

The reaction mixture was then diluted with 200 ml. of distilled water, acidified with 20% sulfuric acid solution to pH 4.0 and extracted twice with 200 ml. of benzene. The benzene layer was separated, dried over anhydrous $MgSO_4$ and the benzene was removed by distillation under reduced pressure. There were obtained 42.0 g. of crude peroxylauric acid having an assay of 94.9%, which corresponds to a yield of 92.8%, based on the acid chloride feed. The product can be purified by recrystallization from benzene.

Example IX

The same procedure was employed as in Example I, except that 18.3 g. of cyclohexanecarbonyl chloride was used as feed. There were obtained 18.0 g. of cyclohexane peroxycarboxylic acid which corresponds to a yield of 99.8%, based on the acid chloride feed.

Example X

In the same manner as described in Example I, a flask was charged with 10.5 g. NaOH, 70 ml. distilled water, 9.0 g. of 50% hydrogen peroxide and 70 g. of tert-butyl alcohol while maintaining the temperature at 4° to 8° C. Then 10 g. of solid succinic anhydride was added portion wise and the reaction mixture maintained at 15° C. for twelve minutes.

The reaction mixture contained 13.4 g. of monoperoxysuccinic acid, indicating a quantitative yield of monoperoxysuccinic acid.

The reaction mixture was then transferred to a separatory funnel and allowed to separate into layers. The upper, alcoholic layer consisted mainly of tert-butyl alcohol which contained trace amounts of unreacted hydrogen peroxide and peroxyacid. The aqueous layer contained the monoperoxysuccinic acid, which was isolated by extracting the acidified reaction mixture with three 100 ml. portions of ethyl acetate. Pure monoperoxysuccinic acid was obtained from the ethyl acetate solution by crystallization as a white crystalline material. Yield 12.5 g.

Example XI

The same procedure was employed as in Example X, except that 14.8 g. of phthalic anhydride was used as feed. After fifteen minutes' reaction time, the mixture contained 18.2 g. of monoperoxyphthalic acid, indicating a quantitative yield.

The reaction mixture was worked up the same way as described in Example X, except that diethyl ether was used as the extraction solvent. There were obtained 17.0 g. of monoperoxyphthalic acid as a white, crystalline material.

Example XII

The same procedure was employed as in Example I, except that benzoyl bromide was employed in place of benzoyl chloride. The yield of peroxybenzoic acid recovered was 99%.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. In the process of producing a peroxycarboxylic acid having at least 4 carbon atoms wherein a compound selected from the group consisting of the acyl halide and the anhydride of the peroxycarboxylic acid to be produced is reacted with an aqueous alkali metal peroxide solution, said solution having an active oxygen content of above about 1% by weight, the improvement which comprises carrying out said reaction in the presence of an aliphatic tertiary alcohol having a water solubility of above about 5% by weight and being non-reactive with said compound and said solution.

2. Process of claim 1 where said solution has an active oxygen content of about 1 to 3% by weight.

3. Process of claim 1 where the tertiary alcohol is employed in at least a 2:1 weight ratio wtih respect to the compound selected from the group consisting of the acyl halide and the anhydride of said peroxycarboxylic acid.

4. Process of claim 1 in which the reaction is carried out at a temperature of between −10° to +20° C.

5. In the process of producing a peroxycarboxylic acid having at least 4 carbon atoms wherein the acyl chloride of the peroxycarboxylic acid to be produced is reacted with an aqueous alkali metal peroxide solution, said solution having an active oxygen content of from about 1% to about 3% by weight, the improvement which comprises carrying out said reaction in the presence of an aliphatic tertiary alcohol having a water solubility of above about 5% by weight and being non-reactive with said acyl chloride and said solution.

6. Process of claim 5 where the tertiary alcohol is employed in at least a 2:1 weight ratio with respect to said acyl chloride.

7. Process of claim 5 where said acyl chloride is m-chlorobenzoyl chloride and the peroxycarboxylic acid is m-chloroperoxybenzoic acid.

8. Process of claim 5 in which said tertiary alcohol is tert-butyl alcohol.

9. Process of claim 5 in which said tertiary alcohol is tert-amyl alcohol.

References Cited by the Examiner

UNITED STATES PATENTS

| | | | |
|---|---|---|---|
| 2,169,368 | 8/1939 | Murray et al. | 260—369 |
| 2,284,477 | 5/1942 | Reichert et al. | 260—502 |
| 2,395,638 | 2/1946 | Milos | 260—502 |
| 3,130,169 | 4/1964 | Blumbergs et al. | 260—502 |

FOREIGN PATENTS

| | | |
|---|---|---|
| 1,177,466 | 12/1958 | France. |
| 1,210,832 | 10/1959 | France. |
| 409,779 | 2/1925 | Germany. |

LORRAINE A. WEINBERGER, *Primary Examiner.*

LEON ZITVER, *Examiner.*